July 19, 1955
L. T. GIBBS
2,713,349
VALVE GAGES AND ASSOCIATED STRUCTURES
FOR RECIPROCATING VALVE DISCS
Filed Sept. 5, 1951
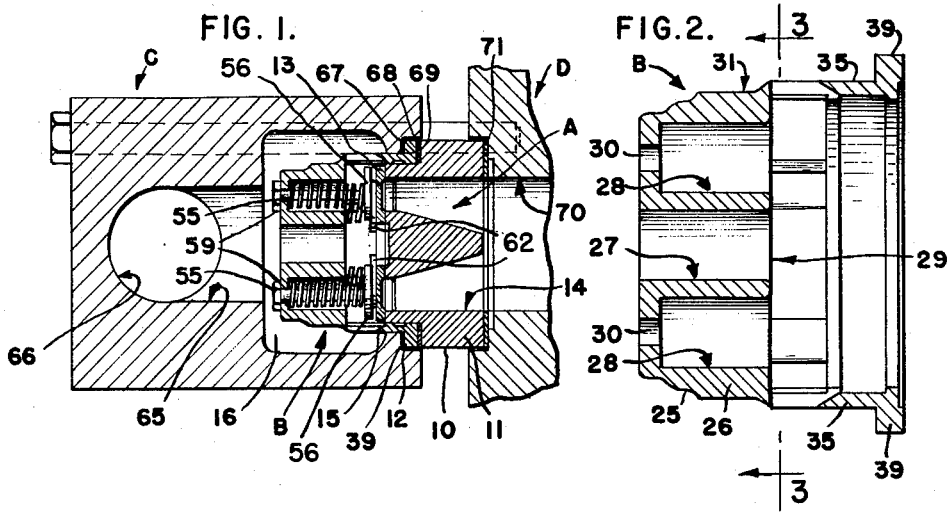
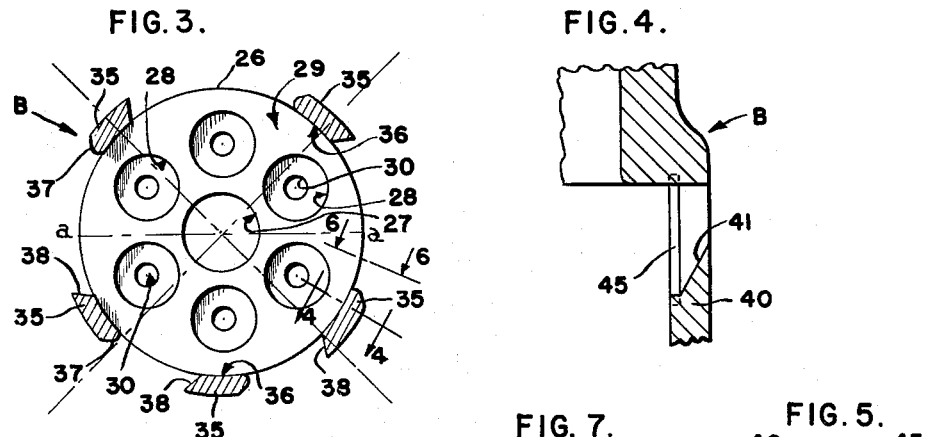
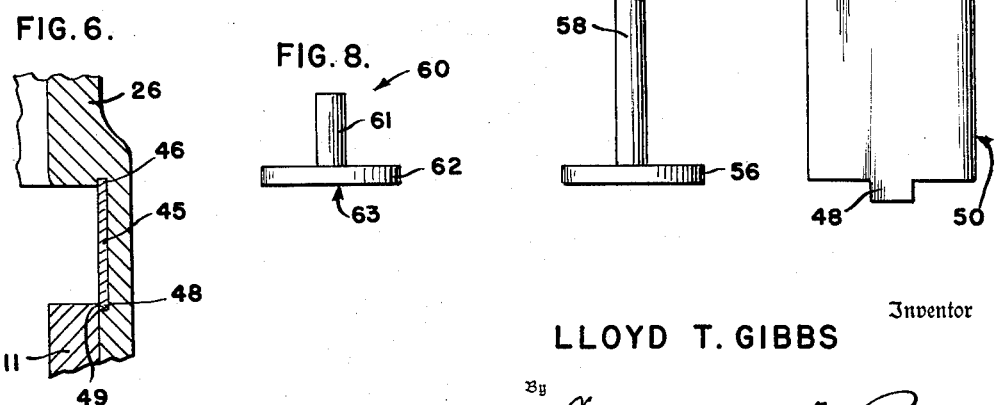
Inventor
LLOYD T. GIBBS
By
Lancaster, Allwine & Rommel
Attorneys

United States Patent Office 2,713,349
Patented July 19, 1955

2,713,349

VALVE CAGES AND ASSOCIATED STRUCTURES FOR RECIPROCATING VALVE DISCS

Lloyd T. Gibbs, Tulsa, Okla.

Application September 5, 1951, Serial No. 245,140

2 Claims. (Cl. 137—331)

This invention relates to current rotating reciprocating valve plate or disc nonstop valves and more particularly to valve cages and associated structure for such valves.

An important object of the invention is to provide a valve cage which is so constructed that wear on the edges of the valve plate or disc will be minimized.

Another object is to provide such a cage which is adapted to reduce wear on the side of the valve plate or disc opposite the valve seat.

A further important object is to provide a new valve cage which will direct flow of fluid in such a way that there will be provided a partially floating valve structure.

Another important object is to provide a valve cage so constructed that wear by the fluid upon the structure (as a manifold) enclosing it will be lessened.

In addition, an important object is to provide dampening or cushioning means for a reciprocating valve plate disposed within a valve cage.

Furthermore, an important object is to provide a detachable wear plate for employment with portions of the valve cage disclosed herein.

Other objects and advantages of the invention will be apparent during the course of the following detailed description of the invention, taken in connection with the accompanying drawing, forming a part of this disclosure and in which drawing:

Fig. 1 is a vertical section of a valve including the new cage.

Fig. 2 is a vertical section of the new cage, removed from the valve and shown on a scale larger than that of Fig. 1.

Fig. 3 is a transverse section of the new cage, substantially on the line 3—3 of Fig. 2.

Fig. 4 is an enlarged fragmentary sectional view substantially on the line 4—4 of Fig. 3.

Fig. 5 is an enlarged elevation of a wear plate for portions of the cage.

Fig. 6 is a fragmentary vertical section of the cage with a wear plate inserted, substantially on the line 6—6 of Fig. 3.

Fig. 7 is an elevation of one kind of valve stop associated with the cage.

Fig. 8 is an elevation of another kind of valve stop also associated with the cage.

In the drawing, wherein for the purpose of illustration is shown a preferred embodiment of the invention and wherein similar reference characters designate corresponding parts throughout the several views, the letter A designates the valve generally; the letter B, the new cage thereof; C, a manifold; and D a structure, as a working barrel, supporting the valve.

The valve A includes a valve seat-containing portion 10, having a stepped outer wall 11 providing a peripheral outer shoulder 12 spaced from the seat 13 which surrounds the fluid passageway 14.

Reciprocable and rotatable within the valve is a valve plate or disc 15 adapted to seat on the seat 13 and close the passageway 14, or to rise and permit flow of fluid through the passageway 14, around the plate or disc 14, out of the fluid passageways of the cage to be subsequently described and into the chamber 65 in the manifold C and from thence into the passageway 66.

The new cage B includes a body portion 25 having a preferably substantially circular wall 26 with a fluid passageway 27 extending therethrough at the axial center thereof and a plurality of spaced-apart sockets 28 opening into the inner or valve seat-facing face 29. Each socket 28 has a small opening 30 at the axial center of its base, opening into the outer face 31 of the wall 26. In the example shown in Fig. 3, there are six equally spaced-apart sockets 28 with an opening 30 for each.

Extending from the body portion 25 toward the shoulder 12 is a plurality of spaced-apart legs 35. In Fig. 3, five legs 35 are shown by way of example. The number of legs 35 may vary but the arrangement should be such that the equivalent of twice the area of the surface 36 of the legs 35 in contact with the outer periphery of the valve plate or disc 15 must be employed in such contact. That is, this area may be substantially equal areas on two legs, or the area on one leg plus one-half the area on two other legs. Of course the diameter of the valve plate or disc 15 must also be taken into consideration in this provision. For example, the diameter of a plate or disc 15 may be four inches and the distance $a$—$a$ in Fig. 3 may then be four-and-one-eighth inches. To effect this plural contact, the legs 35 are spaced apart different distances, one with respect to another as may be appreciated from Fig. 3, where 45° angles indicate the positions of the several legs.

Each leg 35 shows a rounding of a portion of the longitudinally-extending lagging end edge or face 37 thereof. On the contrary, the opposed longitudinally-extending end edge or face 38 is not rounded. The radius of the arc of the rounded edge may be one-sixteenth inch. In addition the substantially straight portion of the edge 37 is not parallel to the edge 38, and they diverge outwardly. The angle of the edge 38 with respect to a straight line extending from the axis of the wall 26 and passing through the juncture at the inner end of the edge 38 and periphery of the wall 26 is preferably substantially 35°. These departures from conventional construction are such that the direction taken by the fluid flowing around the valve plate 15 tends to rotate the latter slightly and this slight rotation prolongs the life of the latter. The rounded portions of the edges 37 will not be apt to wear a groove in the rotating valve plate 15 and they have the additional important functions of providing mouths or funnels whereby fluid will be funneled into these mouths and, flowing between the legs 35 and adjacent portions of the periphery of the valve plate, will provide a film of fluid between legs and plate. The velocity of the fluid is especially great the instant following the rise of the plate 15 from the seat 13.

The legs 35 are provided with feet 39 which are adapted for disposal between the shoulders 12 and a shoulder 67 of the manifold C (with suitable gaskets between). Each foot is joined to the next foot by a joining portion to provide a continuous inturned flange.

Means to control the direction of the flow of fluid between the plate 15 and portion 10 comprises a beveled web or wall 40 connecting each adjacent leg 35, with the beveled surface 41 shown in Fig. 4. As the valve plate 15 rises, the fluid escaping at the mouth of the fluid passageway 14 strikes the beveled surface 41 and is directed away from the sides of the manifold C.

Means to provide protection against wear on the legs 35 may be provided as shown particularly in Figs. 6 and 7 and comprises a wear plate 45 having a width substantially equal to the width of each leg and a height somewhat less than the height thereof. There is a wear plate for each leg and each plate may be provided with a lug 46 adapted to extend into a socket 47 in the wall 26 of the cage B, and a second lug 48 opposite the lug 46 and adapted to set in a groove or recess 49 in the leg 35. Since the stepped outer wall 11 extends to cover this lug 48, it aids in retaining the wear plate 45 in position in conjunction with the walls of the socket 47. The plates 45 may be made of alloy metals, of plastics or rubber. Their use obviates wear upon the legs and, consequently, the entire cage need not be replaced as would be required were there no means to take the wear other than the legs. It is desirable that the edge 50 of the wear plate be rounded to conform to the rounded portions of the edges 37.

Associated with the valve A and its cage B is a dampening means to check movements of the plate 15 and includes a plurality of expansion helical springs 55 there being one for each socket 23, with one end of each spring bearing against the wall at the base of its associated socket and the opposite end of each spring bearing against a flange 56 of stops 57 and the spring encircling the shank 58 of the stop. In the example shown, the shanks of two stops 180° apart are elongated and extend through the socket 28 and opening 30 and protrude outwardly of the opening 30. The protruding end of each shank 58 is preferably screw threaded to receive a nut 59 so that the stops 57 may be adjusted whereby their flanges 56 will not quite contact the seated valve plate 15. Second stops 60 are preferably provided in conjunction with the stops 57 but differ from the latter in having shorter shanks 61 and no nut associated therewith. Stops 60 are disposed in the other sockets, with the springs 55 associated therewith bearing, at one end, upon the flanges 62, when the valve plate is unseated, and the convolutions encircle the shank 61. The flat outer faces 63 of the flanges 62 are urged against the outer face of the valve plate 15. By this arrangement of stops 57 and 60, the pressure of the fluid in the valve will cause the plate 15 to unseat against the tension of the springs surrounding the stops 60 and the tension of the other springs subsequently will come into play and cushion the movement of the plate 15 so that there will be no slamming of the latter.

At the instant the valve plate 15 begins to unseat the initial fluid velocity is high. This provides a fluid film between the edge of the valve plate and the valve cage legs 35. The direction of the flow as influenced by the edges 37 and 38 of the valve cage arms tends to rotate and float the valve plate. Rotation adds greatly to the life of the valve plate, by equalizing the tendency to wear at any given area.

Many fluids carry abrasive and corrosive materials and the varied velocities of the fluid flowing between the valve and the seat tend to wear away the portions of the manifold C. The beveled surface 41 directs the fluid so that the velocity is slowed in the larger chamber 16 within a relatively short period of time, and erosion is not so apt to take place.

The manifold C has a chamber 65 opening to the passageways of the cage. A port 66 is shown as opening from the chamber 65 and the open end of the manifold adjacent the seat-containing portion 10 of the valve A has an inwardly-extending shoulder 67 and a rim 68 with an inwardly-facing face 69, extending to the inner end of the shoulder.

A working barrel D is shown by way of example, as a support for the valve A and has a fluid passageway 70 and a shoulder 71 at the mouth of the passageway adapted to receive the inner end of the wall 11, with a suitable gasket therebetween.

Various changes may be made to the form of the invention herein shown and described without departing from the spirit of the invention or scope of the following claims.

What is claimed is:

1. In combination with a reciprocating valve disc and a cage having a wall provided with a valve disc facing face and an opposite face, a plurality of spaced-apart sockets extending from said valve facing face toward the other face, two of said sockets being spaced substantially 180° apart and having openings from their bases to said opposite face, means to dampen movement of said disc toward said first-named face, including an expansion spring within one of said two of said sockets, an expansion spring within the other of said two of said sockets, stops having shanks extending through said two of said sockets and through said openings and with their ends protruding outwardly of said openings, flanges fixed to said shanks and urged into intimate contact with said disc only when said disc is unseated, by said springs bearing against said flanges, means carried by said protruding ends and bearing against said opposite face to adjust the tension of said springs bearing against said flanges whereby said flanges are free of said disc when said disc is seated, substantially alike second expansion springs within each of the other sockets, second stops having shanks extending into said other sockets and a flange fixed to each shank of said second stops with said second expansion springs bearing against said floating stops and said second stops in contact with said valve disc when said valve disc is seated.

2. In combination with a rotatable and reciprocable valve disc having a substantially horizontal reciprocatory direction of movement, and a valve cage containing said valve disc, said cage having a body portion including a wall having a central fluid passageway and a plurality of spaced-apart elongated substantially straight legs extending from said wall and away from said passageway and with their longitudinal axes substantially paralleling the path of reciprocation of said valve disc, each leg having an arcuate face facing the periphery of said valve disc, a substantially straight edge joining said face at an angle to a radius of said valve disc and a second edge which is substantially parallel to said straight edge and extends to said face with a corner portion of said second edge being rounded transversely where it joints said face, whereby said legs provide guides for said valve disc and the rounded portions of the second edges provide mouths for funnelling fluid to film between said legs and said valve disc.

References Cited in the file of this patent

UNITED STATES PATENTS

| | | |
|---|---|---|
| 281,369 | Jarecki | July 17, 1883 |
| 851,182 | Rowbotham | Apr. 23, 1907 |
| 936,233 | Black | Oct. 5, 1909 |
| 1,233,693 | Niebling | July 17, 1917 |
| 1,251,420 | Richards | Dec. 25, 1917 |
| 1,287,751 | Richards | Dec. 17, 1918 |
| 1,451,644 | Zachary | Apr. 10, 1923 |
| 1,555,068 | Nixon | Sept. 29, 1925 |
| 1,566,403 | Hoffman | Dec. 22, 1925 |
| 1,705,941 | Moody | Mar. 19, 1929 |
| 1,705,942 | Moody | Mar. 19, 1929 |
| 1,737,706 | Collings | Dec. 3, 1929 |
| 1,753,024 | Rode | Apr. 1, 1930 |
| 1,940,999 | Ferlin | Dec. 26, 1933 |
| 1,990,371 | Chadwick | Feb. 5, 1935 |
| 2,495,880 | Volpin | Jan. 31, 1950 |
| 2,579,667 | Hanson | Dec. 25, 1951 |
| 2,590,686 | Coffey | Mar. 25, 1952 |
| 2,644,480 | Earle | July 7, 1953 |